United States Patent
Yu et al.

(10) Patent No.: US 8,423,728 B1
(45) Date of Patent: Apr. 16, 2013

(54) PHYSICAL BASED SCHEDULER USING RUN COUNT AND SKIP COUNT VALUES

(75) Inventors: Rong Yu, Franklin, MA (US); Peng Yin, South Grafton, MA (US); Stephen R. Ives, West Boylston, MA (US); Adi Ofer, Framingham, MA (US); Gilad Sade, Newton, MA (US); Barak Bejerano, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 1372 days.

(21) Appl. No.: 11/154,234

(22) Filed: Jun. 16, 2005

(51) Int. Cl.
*G06F 12/00* (2006.01)
*G06F 13/00* (2006.01)

(52) U.S. Cl.
USPC .......................... 711/158; 711/100; 711/154

(58) Field of Classification Search .................. 711/158, 711/100, 154
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 5,918,020 A * | 6/1999 | Blackard et al. | 709/228 |
| 5,987,031 A * | 11/1999 | Miller et al. | 370/412 |
| 6,665,740 B1 * | 12/2003 | Mason et al. | 710/6 |
| 7,099,273 B2 * | 8/2006 | Ha et al. | 370/229 |
| 7,809,850 B2 * | 10/2010 | Shimizu et al. | 709/231 |
| 2003/0063562 A1 * | 4/2003 | Sarkinen et al. | 370/230 |

* cited by examiner

*Primary Examiner* — Tuan V. Thai
(74) *Attorney, Agent, or Firm* — Muirhead and Saturnelli, LLC

(57) ABSTRACT

Scheduling jobs for a plurality of logical devices associated with physical devices includes assigning a physical run count value and a physical skip count value to each of the physical devices, at each iteration, examining the physical skip count value and the physical run count value for each of the physical devices, and scheduling a number of jobs up to the physical run count value for logical devices associated with a particular one of the physical devices at each iteration corresponding to the physical skip count value for the particular one of the physical devices. The physical skip count value and the physical run count value for a particular one of the physical devices may vary according to a total load of the particular physical device. The total load of the particular physical device may vary according to a number of jobs for all logical devices associated with the particular physical device and a total number of all jobs for all physical devices associated with a particular physical device controller.

14 Claims, 10 Drawing Sheets

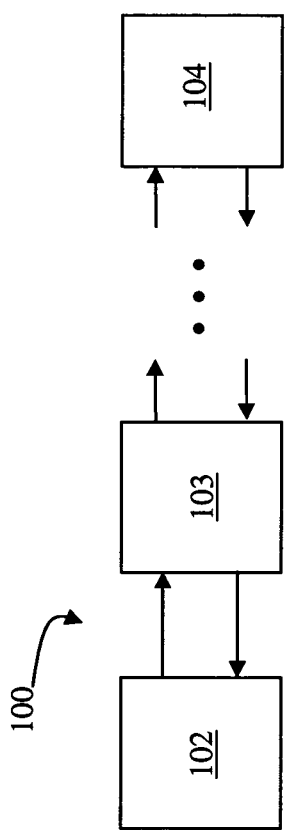
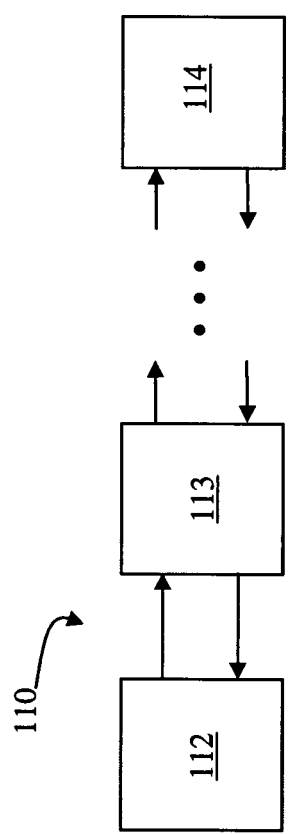
FIGURE 3
FIGURE 4

PHYSICAL BASED SCHEDULER USING RUN COUNT AND SKIP COUNT VALUES

BACKGROUND OF THE INVENTION

1. Technical Field

This application relates to computer storage devices, and more particularly to the field of scheduling jobs for computer storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some cases, a disk adaptor (DA) may have multiple devices (disk drives) coupled thereto. A plurality of sources provide requests for service (jobs) to a DA which then parses and schedules the jobs by, for example, providing appropriate commands to the disk drives corresponding to read requests, write requests, etc. At certain times, jobs may be posted to a DA faster than the jobs can be processed in real time. It is desirable to provide a system that optimizes processing of jobs to provide acceptable throughput while still maintaining appropriate response times for jobs posted to a DA.

SUMMARY OF THE INVENTION

According to the present invention, scheduling jobs for a plurality of logical devices associated with physical devices includes assigning a physical run count value and a physical skip count value to each of the physical devices, at each iteration, examining the physical skip count value and the physical run count value for each of the physical devices, and scheduling a number of jobs up to the physical run count value for logical devices associated with a particular one of the physical devices at each iteration corresponding to the physical skip count value for the particular one of the physical devices. The physical skip count value and the physical run count value for a particular one of the physical devices may vary according to a total load of the particular physical device. The total load of the particular physical device may vary according to a number of jobs for all logical devices associated with the particular physical device and a total number of all jobs for all physical devices associated with a particular physical device controller. Scheduling a number of jobs may include examining each of a plurality of logical devices associated with the particular physical device to schedule jobs for a subset of the plurality of logical devices. Scheduling jobs for a plurality of the logical devices may include assigning a logical run count value and a logical skip count value to at least some of the logical devices, at each iteration, examining the logical skip count value and the logical run count value for the at least some of the logical devices, and scheduling a number of jobs up to the logical run count value for a particular one of the logical devices at each iteration corresponding to the logical skip count value for the particular one of the logical devices. No logical skip count value and no logical run count value may be associated with logical devices having only pending read jobs. Logical devices having pending read jobs may be given precedence over other logical devices. No more than one read job may be scheduled for a logical device at each iteration. Logical devices having only pending read jobs may have no logical skip count value associated therewith and may have a logical run count value of one. Scheduling jobs for a plurality of logical devices associated with physical devices may include periodically recalculating physical skip count values and physical run count values for physical devices.

According further to the present invention, a computer program product, in a computer readable storage medium, that schedules jobs for a plurality of logical devices associated with physical devices, includes executable code that assigns a physical run count value and a physical skip count value to each of the physical devices, executable code that, at each iteration, examines the physical skip count value and the physical run count value for each of the physical devices, and executable code that schedules a number of jobs up to the physical run count value for logical devices associated with a particular one of the physical devices at each iteration corresponding to the physical skip count value for the particular one of the physical devices. The physical skip count value and the physical run count value for a particular one of the physical devices may vary according to a total load of the particular physical device. A total load of the particular physical device may vary according to a number of jobs for all logical devices associated with the particular physical device and the total number of all jobs for all physical devices. Executable code that schedules a number of jobs may include executable code that examines each of a plurality of logical devices associated with the particular physical device to schedule jobs for a subset of the plurality of logical devices. Executable code that schedules jobs for a subset of the plurality of the logical devices may include executable code that assigns a logical run count value and a logical skip count value to at least some of the logical devices, executable code that, at each iteration, examines the logical skip count value and the logical run count value for at least some of the logical devices, and executable code that schedules a number of jobs up to the logical run count value for a particular one of the logical devices at each iteration corresponding to the logical skip count value for the particular one of the logical devices. The computer program product may also include executable code that periodically recalculates physical skip count values and physical run count values for physical devices.

According further to the present invention, a data storage device includes at least one host adaptor that receives data to be stored in the storage device and at least one disk adaptor coupled to the at least one host adaptor and to a plurality of physical disk drives that contain data, wherein the at least one disk adaptor includes a computer program product, in a computer readable storage medium, that schedules jobs for a plurality of logical devices associated with the plurality of physical disk drives, the computer program product including executable code that assigns a physical run count value and a physical skip count value to at least a subset of each of the physical disk drives, executable code that, at each iteration, examines the physical skip count value and the physical run count value for each of the physical disk drives, and executable code that schedules a number of jobs up to the physical run count value for logical devices associated with a particular one of the physical disk drives at each iteration corresponding to the physical skip count value for the particular one of the physical disk drives. The at least one host adaptor may be coupled to the at least one disk adaptor through a memory or may be directly to the at least one disk adaptor. The physical skip count value and the physical run count value may vary according to a total load of the disk adaptor.

According further to the present invention, scheduling jobs for a plurality of devices includes assigning a run count value to each of the devices, scheduling a number of consecutive jobs up to the run count value, and decrementing the run count value according to the number of consecutive jobs scheduled. The run count value for a particular one of the devices may vary according to a total load of the particular one of the devices. The total load of the particular device may vary according to a number of pending jobs for the particular device and a total number of jobs for all devices coupled to a controller for the devices. The devices may be disk drive devices. Only one read job may be scheduled for a device irrespective of the run count value for the device and devices having pending read jobs may be given precedence over other devices. Multiple read jobs may be scheduled for a device according to the run count value and devices having pending read jobs may be given precedence over other devices. The disk drive devices may be subdivided into a plurality of logical devices. Scheduling jobs for a plurality of devices may include determining which of the logical devices has pending read jobs using a bit map and determining which of the logical devices has pending jobs other than read jobs by using a linked list.

According further to the present invention, a computer program product, in a computer readable storage medium, that schedules jobs for a plurality of devices, includes executable code that assigns a run count value to each of the devices, executable code that, for a particular one of the devices, schedules a number of consecutive jobs up to the run count value, and executable code that decrements the run count value according to the number of consecutive jobs scheduled. The run count value for a particular one of the devices may vary according to a total load of the particular one of the devices. The total load of the particular one of the devices may vary according to a number of pending jobs for the particular one of the devices and a total number of jobs for all devices coupled to a controller for the devices. The devices may be disk drive devices. Devices having pending read jobs may be given precedence over other devices. The computer program product may also include executable code that periodically recalculates run count values for the devices.

According further to the present invention, a data storage device includes at least one host adaptor that receives data to be stored in the storage device and at least one disk adaptor coupled to the at least one host adaptor and to a plurality of physical disk drives that contain data, where the at least one disk adaptor includes a computer program product, in a computer readable storage medium, that schedules jobs for the plurality of disk drives and includes executable code that assigns a run count value to each of the disk drives, executable code that, for a particular one of the disk drives, schedules a number of consecutive jobs up to the run count value, and executable code that decrements the run count value according to the number of consecutive jobs scheduled. The at least one host adaptor may be coupled to the at least one disk adaptor through a memory. The at least one host adaptor may be coupled directly to the at least one disk adaptor. The run count values may vary according to a total load of the disk adaptor.

The system described herein allows for greater efficiencies and throughput while still addressing issues of unacceptable response time. Providing two layers of scheduling (physical and logical) allows implementing similar scheduling algorithms for both. Giving precedence to read jobs improves response time while interleaving other types of jobs improves efficiency and throughput. In addition, scheduling multiple consecutive jobs for the same device allows the system to take advantage of certain aspects of the hardware to provide additional efficiencies (e.g., multiple consecutive writes to the same drive). Other advantages and features will be apparent from the description elsewhere herein.

BRIEF DESCRIPTION OF DRAWINGS

FIG. 3 is a diagram that shows a linked list of physical device records that may be used according to an embodiment of the system described herein.

FIG. 4 is a diagram that shows a linked list containing a plurality of logical device records according to an embodiment of the system described herein.

DETAILED DESCRIPTION OF VARIOUS EMBODIMENTS

Figure 1:
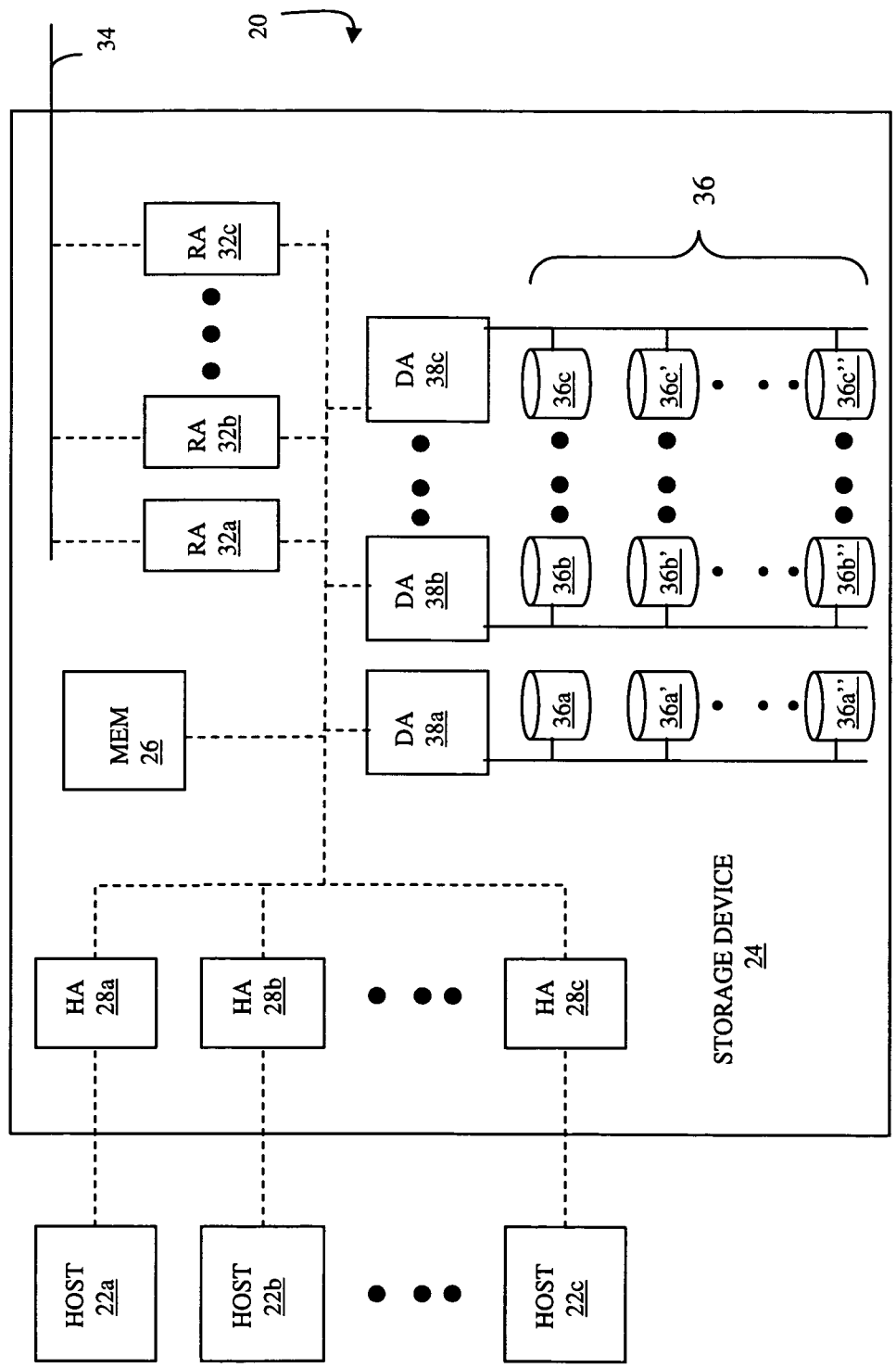
FIG. 1 is a schematic diagram showing a data storage device with a plurality of disk adaptors and disks according to an embodiment of the system described herein.

Referring to FIG. 1, a diagram 20 shows a plurality of hosts 22a-22c coupled to a data storage device 24. Each of the hosts 22a-22c may be coupled using any one of a number of appropriate connection types, including, without limitation, Fibre Channel, ESCON, SCSI, and FICON. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34. The RDF link 34 may be any appropriate type of connection and, in some instances, may include the Internet.

The storage device 24 may also include one or more physical disks 36a-36a", 36b-36b", 36c-36c", each containing a different portion of data stored on the storage device 24. The storage device 24 also include a plurality of disk adapter units (DA's) 38a-38c coupled to the disks 36 using any one of a number of appropriate connection types, including, without limitation, Fibre Channel, ESCON, SCSI, and FICON. The DA 38a exchanges data with and controls the disks 36a-36a". Similarly, the DA 38b exchanges data with and controls the disks 36b-36b" and the DA 38c exchanges data with and controls the disks 36c-36c". It is possible for each of the DA's 38a-38c to control any number of disks. However, in some embodiments, a maximum number may be imposed.

The logical storage space in the storage device 24 that corresponds to the disks 36 may be subdivided into a plurality of volumes or logical devices. The logical devices may or may not correspond to the physical storage space of the disks 36. Thus, for example, the disk 36a may contain a plurality of logical devices or, alternatively, a single logical device may, for example, span both of the disks 36a, 36a'. In an embodiment herein, each of the disks 36 corresponds to one or more logical storage devices, up to a maximum of two hundred and fifty five. The hosts 22a-22c may be configured to access any combination of logical devices independent of the location of the logical devices on the disks 36.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks (jobs) that are to be performed by one or more of the DA's 38a-38c, the HA's 28a-28c and the RA's 32a-32c, and a cache for data fetched from one or more of the disks 36. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
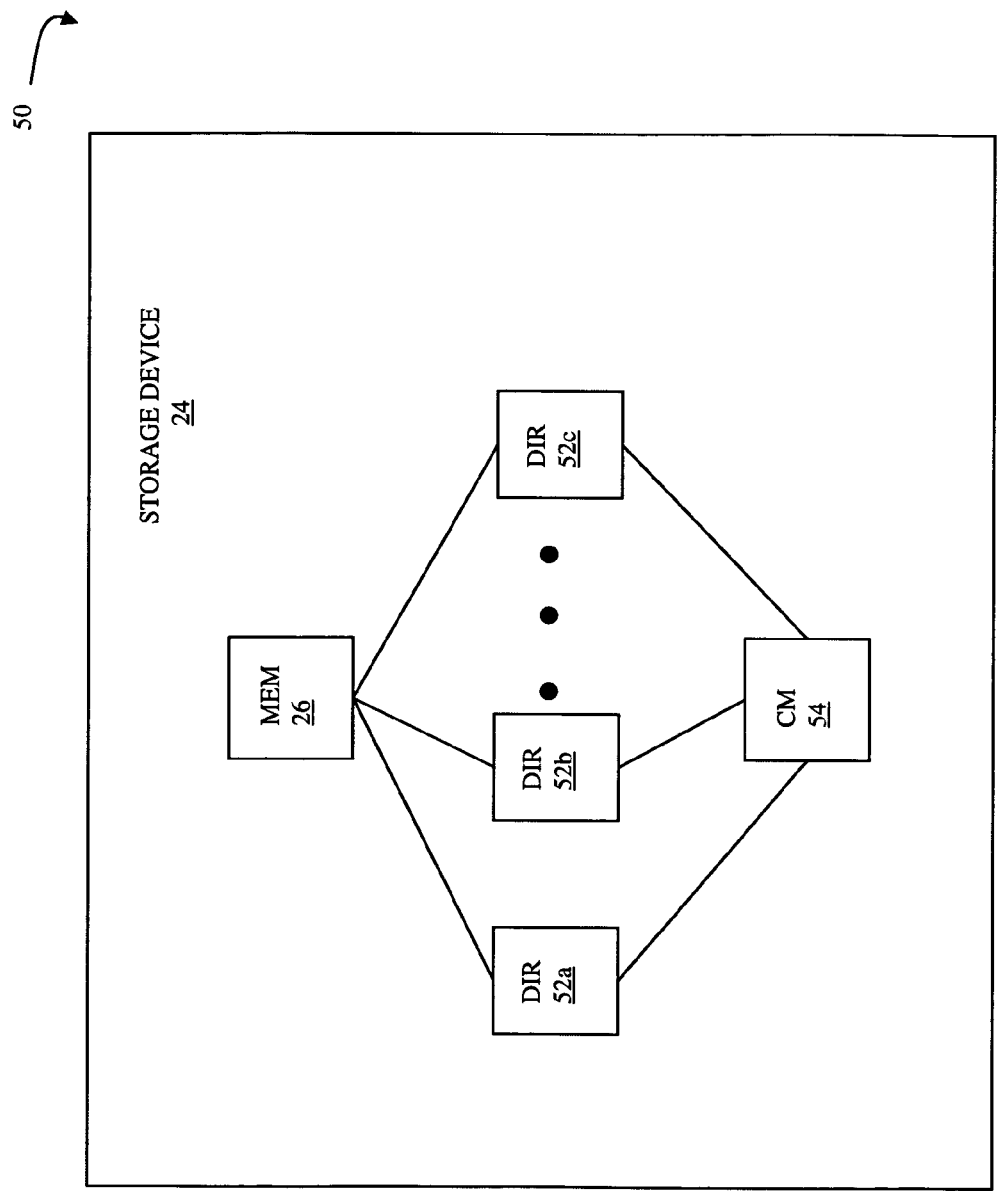
FIG. 2 is a schematic diagram showing a storage device, memory, a plurality of directors, and a communication module according to an embodiment of the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment herein, there may be up to sixteen directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. The CM 54 may be implemented in sections using hardware on each of the directors 52a-52c so that the directors 52a-52c are coupled together. In addition, a sending one of the directors 52a-52c may be able to broadcast a message to all of the other directors 52a-52c at the same time.

For the system described herein, each of the DA's 38a-38c processes a plurality of jobs (work requests) from different sources, including the HA's 28a-28c, the RA's 32a-32c, and other sources. The jobs may include requests to read data from the disks 36, requests to write data to the disks 36, etc. The DA's 38a-38c receive the requests and then formulate and present appropriate I/O operations to the disks 36. In an embodiment herein, the requests processed by the DA's 38a-38c include read requests, write requests, copy requests, prefetch requests, scrub requests, and RAID servicing requests. Ideally, the DA's 38c-38c process these requests and present I/O operations to the disk's 36 in a way that provides appropriate throughput and response time.

Referring to FIG. 3, a diagram shows a linked list 100 of physical device records 102-104 that may be used to implement the system described herein. In some embodiments, the linked list 100 may be stored locally on each of the DA's 38a-38c. In other embodiments, a separate instance of the linked list 100 for each of the DA's 38a-38c may be stored in the memory 26.

Each of the physical device records 102-104 of the list 100 represents a separate physical device attached to a particular DA. Thus, for example, if the list 100 was being used by the DA 38a, then each of the physical device records 102-104 could represent one of the disk's 36a, 36a', 36a". As discussed in more detail elsewhere herein, the DA 38a traverses the list 100 to determine which jobs to schedule for the disk's 36a, 36a', 36a" using information stored with each of the physical device records 102-104. In some embodiments, the list 100 contains a corresponding record for all of the physical devices attached to a DA, in which case, when the list is traversed in connection with scheduling (as described elsewhere herein), particular ones of the physical device records 102-104 corresponding to physical devices for which there are no pending jobs are skipped. In other embodiments, the list 100 contains only physical device records corresponding to physical devices for which there are pending jobs.

Referring to FIG. 4, a diagram shows a linked list 110 containing a plurality of logical device records 112-114, each corresponding to a particular logical device. In some embodiments, the list 110 contains information only for logical devices for which there are pending jobs except, perhaps, pending reads (explained elsewhere herein). In other embodiments, two versions of the list 110 may be used: a first version for logical devices having pending reads associated therewith and another version of the list 110 for logical devices having pending other operations (besides reads) associated therewith. In still other embodiments, the list 110 corresponds to all of the logical devices of a single physical device, in which case logical device records corresponding to a logical device having no pending jobs (or no pending jobs other than read jobs) may be skipped when traversing the list 110. Thus, for example, the list 110 could represent all of the logical devices for the disk 36a.

The system described herein traverses the list 110 and uses information stored with each of the logical device records 112-114 along with the list 100 and the physical device records 102-104 to determine which jobs to schedule. Just as with the list 100 of FIG. 3, the list 110 may be stored locally in each of the DA's 38a-36c or stored in memory 26.

Figure 5:
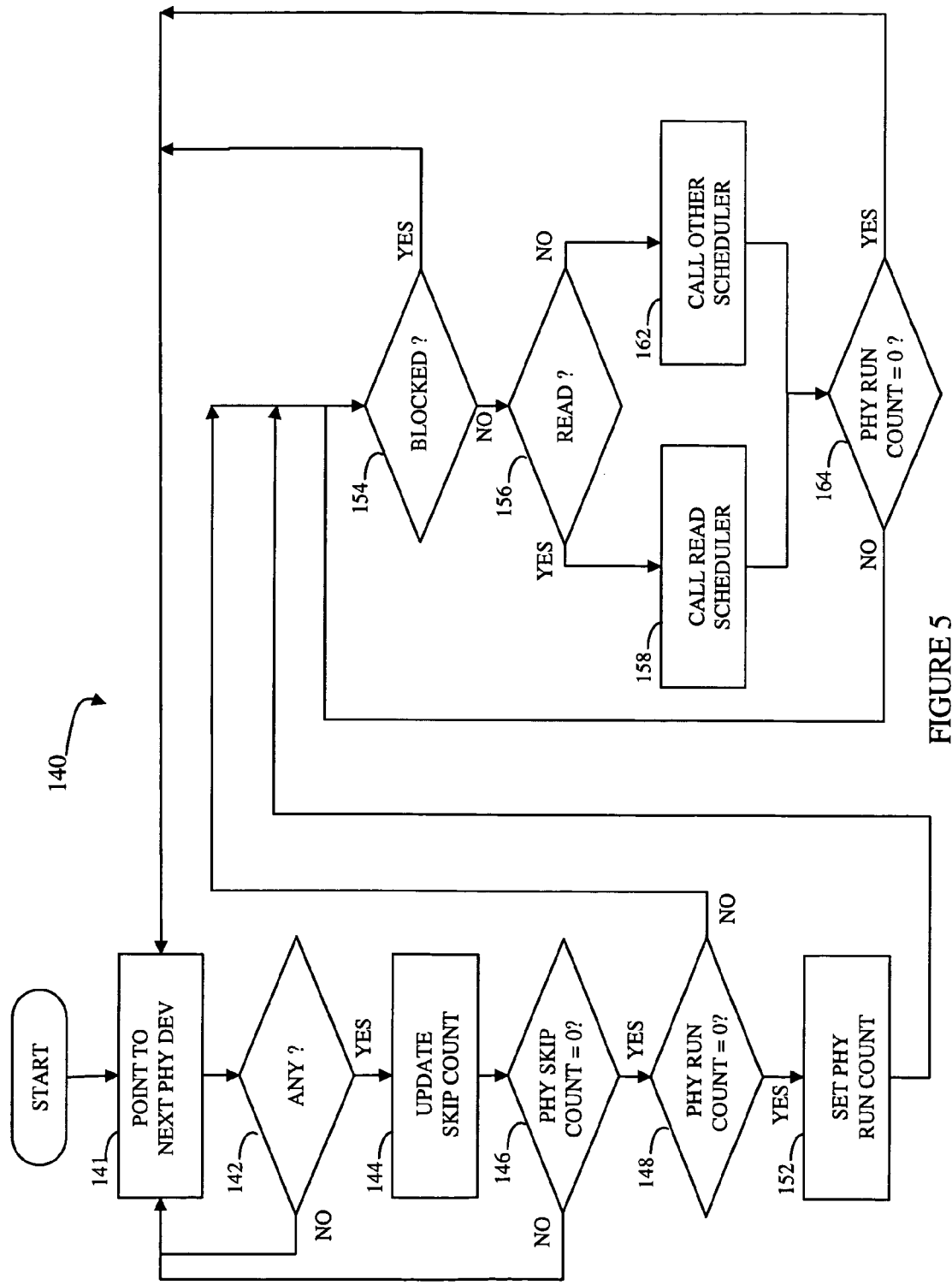
FIG. 5 is a flow chart that illustrates steps performed by a disk adaptor in connection with traversing a list of physical devices to determine jobs to be scheduled according to an embodiment of the system described herein.

Referring to FIG. 5, a flow chart 140 illustrates steps performed by each of the DA's 38a-38c in connection with traversing the list 100 of physical devices to determine jobs to be scheduled. In an embodiment described herein, there is a general preference for read operations so that read operations have a higher priority. In some embodiments, operations may be divided into two classes: read operations and all other operations (e.g., write, copy, scrub, etc.).

Processing begins at a first step 141, where a pointer that points to the particular physical device being processed (for which I/O's are being performed) is made to point to the next physical device in the list 100 of physical devices for which there are pending jobs. Following the step 141 is a test step 142 where it is determined if there are any physical devices having jobs to schedule. In some instances, there may be no pending jobs for any of the devices. When this occurs, control transfers from the step 142 back to the step 141 to cause a polling loop that waits until there are jobs available to perform. Once it is determined at the test step 142 that there are available jobs, control transfers from the test step 142 to a step 144 where a physical skip count variable is updated. The physical skip count is part of the data stored in each of the physical device records 102-104 of the list 100 and indicates whether a physical device should be skipped for scheduling on a current iteration. Generally, a physical device with less urgent pending jobs (e.g., no read jobs) is provided with a relatively high skip count while physical devices with more urgent pending jobs (e.g., read jobs) are provided with a relatively low skip count or a skip count of zero. Setting the physical skip count in the physical device records 102-104 is discussed in more detail elsewhere herein. Updating the physical skip count at the step 144 involves decrementing the physical skip count to a minimum of zero. That is, the processing performed at the step 144 is:

physical skip count=min(zero,physical skip count−one).

In other embodiments, the physical skip counter may be a relatively fixed value and there may be a separate iteration counter that keeps track of the number of iterations. In such embodiments, the iteration counter would start at zero and then would be incremented at each iteration. When the iteration counter becomes greater than or equal to the skip counter, then jobs may be scheduled on the physical device and the iteration counter may be reset to zero.

Following the step 144 is a test step 146 where it is determined if the physical skip count is zero. A non-zero physical skip count indicates that no jobs should be scheduled for the corresponding physical device on the current iteration. If it is determined at the test step 146 that the physical skip count is zero, then control transfers from the test step 146 to a test step 148 where it is determined if a physical run count variable is zero. The physical run count is another variable that is stored in each of the physical device records 102-104 of the list 100. The physical run count variable represents the number of consecutive operations for the physical device that may be scheduled. Thus, for example, if the run count variable is three, then three consecutive operations for the physical device will be scheduled.

Consecutively scheduling jobs for the same physical device provides efficiencies for the device in many instances. For example, a number of successive reads to the device may take less time if performed consecutively than if the reads are performed separately with operations for other devices interleaved therebetween.

Ideally, the physical run count would always be zero at the step 148 because, as described in more detail elsewhere herein, the physical run count variable is used to keep track of each job that is scheduled. Ideally, on each iteration, the system is able to schedule as many jobs as are indicated by the physical run count and thus decrement the physical run count to zero. However, in some instances, it may not be possible to perform the number of jobs indicated by the physical run count, in which case there may be a non-zero value for the physical run count variable remaining from a previous iteration.

If it is determined at the test step 148 that the physical run count is zero, then control transfers from the step 148 to a step 152 to determine (i.e., to set) the physical run count. In an embodiment herein, the physical run count is set equal to the value of a max physical run count variable, another variable of the physical device records 102-104. Thus, at the step 152, the value of physical run count is set equal to the value of max physical run count. Determination and manipulation of max physical run count is described in more detail elsewhere herein.

Following the step 152, or following the step 148 if the physical run count is not zero, is a test step 154 which determines if operation of the DA is blocked. In some embodiments, the DA may use an operation queue to provide formatted operations thereto which are sent to the corresponding devices (disk drives). For those embodiments, the test at the step 154 may determine whether or not the queue is full. In other embodiments, there may be other tests/criteria used at the step 154 to determine if the DA may proceed with operations for a particular physical device.

If it is determined at the test step 154 that the operations for the DA are not blocked, then control transfers from the test step 154 to a test step 156, which determines if the job(s) to be scheduled are read jobs. Setting and determining whether job(s) to be scheduled are read jobs or are other (i.e., non-read) jobs is described in more detail elsewhere herein. If it is determined at the test step 156 that the job(s) to be scheduled are read jobs, then control transfers from the test step 156 to a step 158 where a read scheduler routine is called. Otherwise, control transfers from the test step 156 to a step 162 where another operation scheduler routine is called. The read scheduler routine and the other operation scheduler routine are discussed in more detail elsewhere herein.

Following the step 158 or the step 162 is a test step 164 where it is determined if the physical run count is zero. Both the read scheduler routine and the other operation scheduler routine manipulate the physical run count according to the number of jobs scheduled so that the physical run count may be changed after calling either routine. If it is determined at the test step 164 that the physical run count is not zero, then control transfers from the test step 164 back to the test step 154, discussed above, for another iteration. Otherwise, if it is determined at the test step 164 that the physical run count is zero, then control transfers from the test step 164 to the step 141, discussed above, where the next physical device is selected. Processing at the step 141 may involve traversing the list 100 from one of the elements 102-104 to a next one of the elements 102-104. Note that the step 141 is also reached if it is determined at the test step 154 that I/O is blocked for a physical device (discussed above) or if it is determined at the test step 146 that the physical skip count is not zero (discussed above). Following the step 141, control transfers to the step 142, discussed above, to determine if there are any available physical devices on which to schedule the next set of jobs.

In some embodiments, the test for being blocked at the step 154 determines if the available space in the queue used for operations is less than the physical run count. That is, for example, if the physical run count is three and the available queue space is only enough for two more operations, then it would be determined at the test step 154 that the operation is blocked. In other embodiments, it may be possible to simply determine if there is enough space on the queue for at least one additional operation at the step 154 and to rely on further tests performed in connection with calling the read scheduler routine at the step 158 or calling the other operation scheduler routine at the step 162.

The flowchart 140 generally illustrates steps performed by a DA in connection with traversing the list 100 to schedule jobs. However, once a physical device is selected, then it is necessary to select a particular logical device (of the physical device) to schedule either read or other jobs therefor. Each of the physical devices for a particular DA has a corresponding set of logical devices thereon, which is represented by the list 110 of logical device records 112-114, discussed above. Thus, after selecting a physical device for scheduling jobs, it is necessary to select a logical device corresponding thereto and schedule jobs for the logical device. This is performed at the step 158 or the step 162, discussed below.

Figure 6:
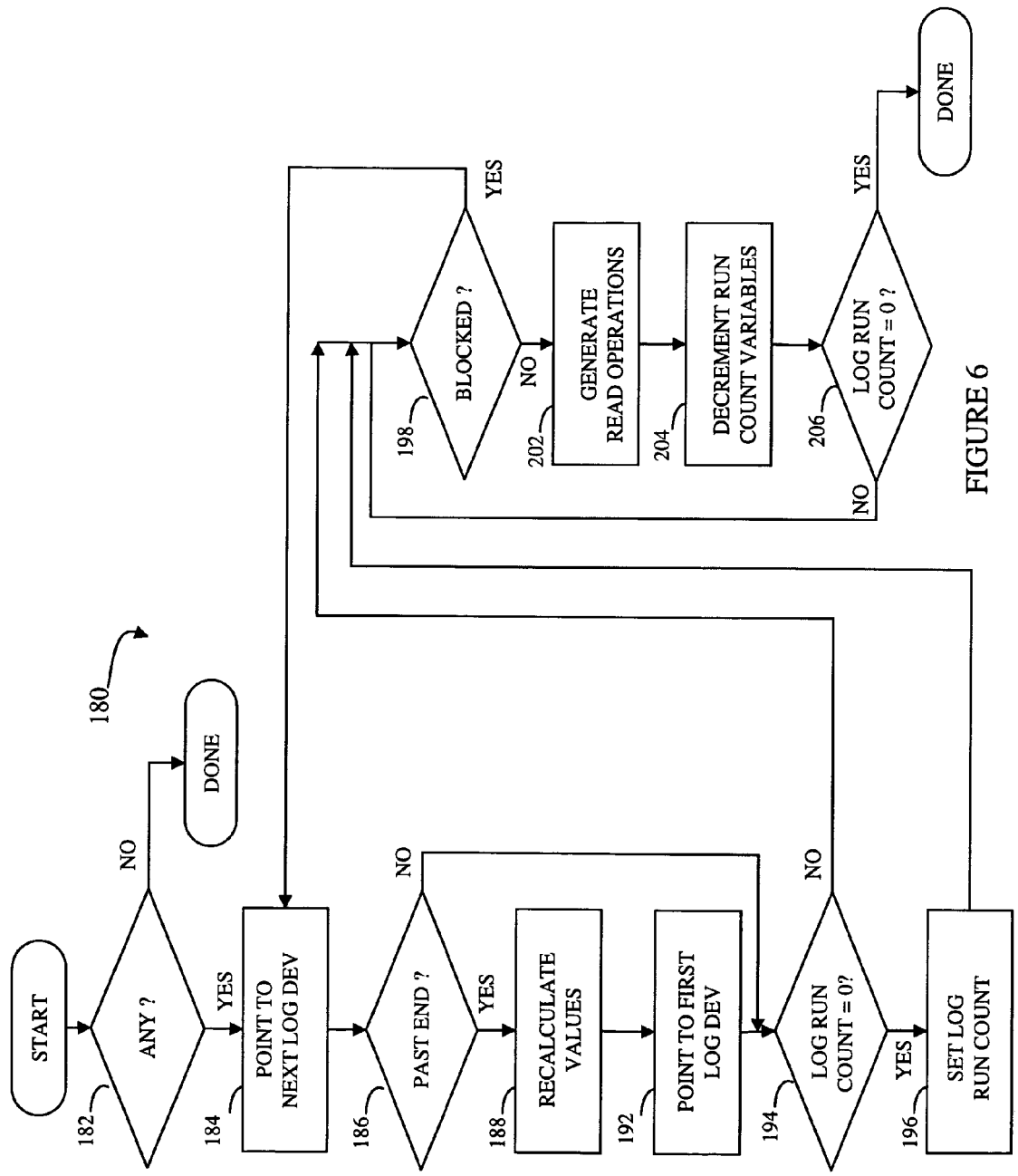
FIG. 6 is a flow chart that illustrates steps performed in connection with a disk adaptor calling a read scheduler routine according to an embodiment of the system described herein.

Referring to FIG. 6, a flow chart 180 illustrates steps performed in connection with the DA calling the read scheduler routine at the step 158 of the flow chart 140 of FIG. 5. Processing begins at a first step 182 where it is determined if there are any logical devices to process (i.e., any logical devices with pending jobs). If not, then processing is complete. Otherwise, control transfers from the step 182 to a step 184 where a pointer being used to iterate through logical devices having pending read jobs is set to point to the next logical device. Following the step 184 is a step 186 where it is determined if the pointer has reached an end of a list of logical devices having pending reads. In an embodiment herein, pending reads are kept track of using a bitmap table of logical devices for a physical device, where a bit is set to one value of a logical device has at least one pending read and set to another value otherwise. For such an embodiment, the pointer points to bits of the bit map.

If it is determined at the step 186 that the end has been reached, then control passes from the step 186 to a step 188 where values used for scheduling, like max physical run count (discussed above), and other values, are recalculated and the lists 100, 110 are reconfigured, if necessary, to add any logical devices and/or physical devices that have received pending jobs since the previous iteration and to remove any logical devices and/or physical devices for which there are no longer any pending jobs. Updating values used for scheduling and reconfiguring lists 100, 110 at the step 188 is discussed in more detail elsewhere herein. Note that, in some embodiments, the step 188 may be omitted and, instead, updating values used for scheduling and reconfiguring the lists 100, 110 may be performed periodically independently of scheduling iterations.

Following the step 188 is a step 192 where the pointer that iterates through the logical devices having pending reads associated therewith is made to point to a first logical device having a pending read. Following the step 192, or following the step 186 if the end of the table has not been reached, is a test step 194 which determines if the value of a logical run count variable associated with the logical device being processed is zero. A separate logical run count variable is associated with each of the logical devices and is used to keep track of the run count for a logical device in a manner similar to use of the physical run count variable, discussed above. Thus, ideally, the logical run count would always be zero at the step 194, but in some cases the logical run count may be something other than zero due to jobs that could not be scheduled at a previous iteration.

If it is determined at the test step 194 that the logical run count is zero, then control transfers from the test step 194 to a step 196 where the logical run count is set to a particular non-zero value. In an embodiment herein, at the step 196 the logical run count is set to a value of another variable, max logical run count, which is also associated with each of the logical devices. Setting and manipulating the value of the max logical run count variable is discussed in more detail elsewhere herein.

Following the step 196, or following the test step 194 if the logical run count is not zero, is a test step 198 which determines if the operation to be performed is blocked. In an embodiment herein, the test at the step 198 determines if there is room in a queue for pending operations for at least one operation to be performed. Alternatively, the test at the step 198 may determine if there is enough room on the queue for a number of operations corresponding to entire logical run count.

If it is determined at the step 198 that the proposed operation(s) for the logical device are blocked, then control transfers from the step 198 back to the step 184 to select another logical device for processing. Otherwise, if it is determined at the test step 198 that the operation is not blocked, then control transfers from the test step 198 to a step 202 where the read operation is generated. In an embodiment herein, the read operation is generated at the step 202 by formatting an appropriate command that may be sent to one of the disk's 36. For example, the command may specify a particular physical cylinder, sector, and block to transfer directly into a set of memory locations in the memory 26. Of course, the actual format of the command generated at the step 202 depends upon the specific types of devices that are coupled to the DA and perhaps even also to the type of connection between the DA and the devices.

Following the step 202 is a step 204 where the physical run count and logical run count are both decremented. In one embodiment, the physical run count and the logical run count are decremented by one at the step 204 because only one read operation is generated at the step 202. However, in other embodiments, the step 202 may be used to simultaneously generate up to logical run count number of consecutive read operations, in which case the logical run count and physical run count may be decremented by the number of read operations generated at the step 202. For example, if three read operations are generated at the step 202, then the physical run count and logical run count would be decremented by three at the step 204.

Following the step 204 is a test step 206 which determines if the logical run count has been decremented to zero, indicating that the desired number of read operations for the logical device have been generated. If so, then processing is complete. Otherwise, then control transfers from the test step 206 back to the step 198, discussed above.

In some embodiments, it is possible to schedule only one read at a time per iteration on a logical device (i.e., no more than one read for a logical device at any one time). In such an embodiment, the steps 194, 194, 206 may be eliminated and, at the step 204, only the physical run count variable would be decremented. Note, however, that it is possible to obtain the same result by setting max logical run count to one in connection with anticipating scheduling a read operation. Thus, the description herein includes embodiments where max logical run count is set to one in connection with anticipating scheduling a read operation.

Figure 7:
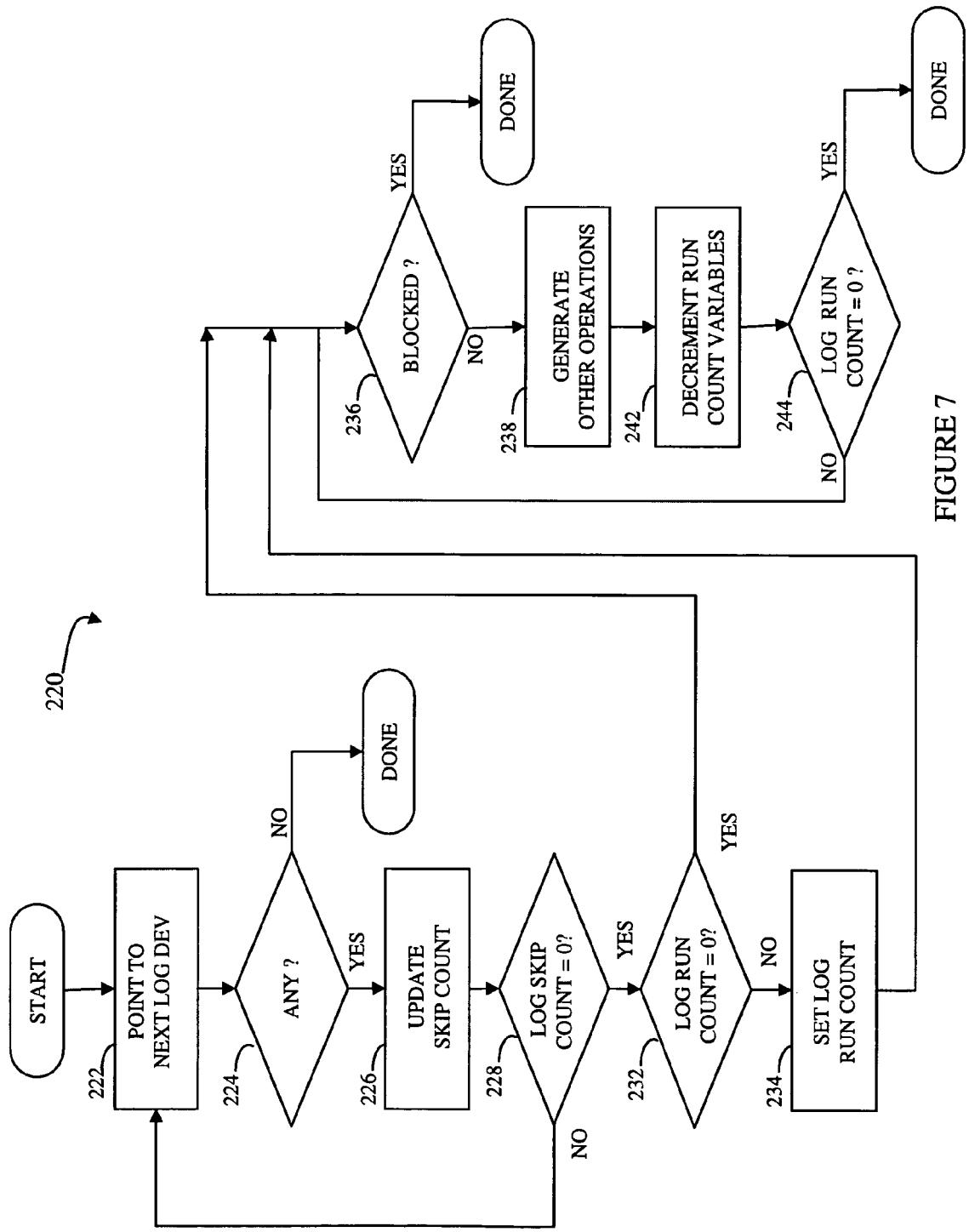
FIG. 7 is a flow chart that illustrates steps performed in connection with a disk adaptor calling an other operations scheduler routine according to an embodiment of the system described herein.

Referring to FIG. 7, a flow chart 220 illustrates steps performed in connection with the other operations scheduler routine illustrated by the step 162 of the flow chart 140 of FIG. 5. Processing begins at a first step 222 where a next one of the logical device records 112-114 of the list 110 is selected. Just as with some embodiments of scheduling the read operations, there are a number of possible techniques that may be used to determine the next logical device for performing other operations, including using the linked list 110 of logical device records for which there are pending jobs or using one or more bit maps where each bit map has a bit corresponding to a logical device of the physical device and/or in a particular bit is set to one value or another, depending upon whether the corresponding logical device has any pending other jobs or not.

Following the step 222 is a test step 224 which determines if there are any pending other jobs for any logical devices. In some cases, there may be no logical devices with pending other jobs (i.e., the list 110 may be empty/null). If so, then processing is complete. Otherwise, control transfers from the test step 224 to a step 226 where the logical skip counter variable for the logical device is updated. Associated with each of the logical device records 112-114 of the list 110 is a logical skip counter variable that is like the physical skip counter variable discussed above in connection with FIG. 5. Thus, updating the logical skip counter at the step 226 involves setting the logical skip counter according to the formula:

logical skip counter=min(zero,logical skip counter−one)

Following the step 226 is a test step 228 which determines if the logical skip counter equals zero. If not, then control transfers from the step 228 back to the step 222 to select another logical device for performing operations thereon. Otherwise, control transfers from the step 228 to a test step 232 which determines if the logical run counter is zero. If so, then control transfers from the test step 232 to a step 234 which sets the logical run counter in a manner similar to setting the logical run counter at the step 196 of the flow chart 180 of FIG. 6. Following the step 234, or following the step 232 if the logical run counter is not zero, is a step 236 which determines if the proposed operation is blocked. The test at the step 236 is like the test at the step 198 of the flow chart 180 of FIG. 6.

Note that, just as with the physical skip counter, in other embodiments, the logical skip counter may be a relatively fixed value and there may be a separate iteration counter that keeps track of the number of iterations. In such embodiments, the iteration counter would start at zero and then would be incremented at each iteration. When the iteration counter becomes greater than or equal to the skip counter, then jobs may be scheduled on the logical device and the iteration counter may be reset to zero.

If it is determined at the step 236 that the proposed operation is blocked, then processing is complete. Otherwise, control transfers from the step 236 to a step 238 where the other operation is generated. In some cases (e.g., a write operation) generating the operation at the step 238 is like generating the read operation at the step 202 where an appropriate command is formulated and provided to one of the disks 36. For example, a command provided to one of the disks 36 may be to transfer data from memory 26 to a particular physical location on one of the disks 36. In other cases, the operation may not require providing a command directly to one of the disk's 36, but may require other (perhaps internal) processing by the DA instead.

Following the step 238 is a step 242 where the logical run counter and the corresponding physical run counter are both decremented. The amount that the run counters are decremented at the step 242 is the number of operations generated at the step 238 (i.e., one operation at a time or multiple operations scheduled at the same time). Following the step 242 is a test step 244 which determines if the logical run counter is zero. If so, then processing is complete. Otherwise, control transfers from the test step 244 back to the step 236 for another iteration.

Figure 8:
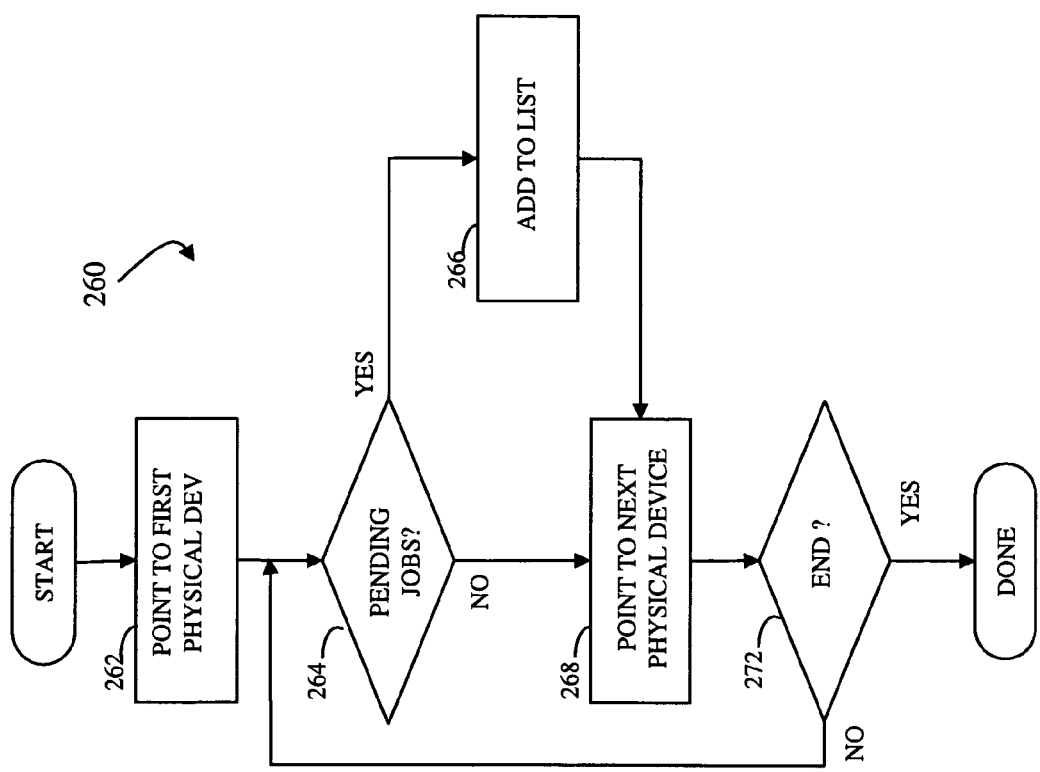
FIG. 8 is a flow chart that illustrates steps performed in connection with constructing a linked list of physical devices according to an embodiment of the system described herein.

Referring to FIG. 8, a flow chart 260 illustrates steps performed by a DA in connection with the step 188 of the flow chart 180 of FIG. 6. As discussed above, at the step 188, values used for scheduling, like max physical run count and other values, are updated and the lists 100, 110 are reconfigured, if necessary, to add any logical devices and/or physical devices that have received one or more pending jobs since the previous iteration and to remove any logical devices and/or physical devices for which there are no longer any pending jobs. The flow chart 260 illustrates steps performed in connection with reconfiguring the list 100 of physical devices. Note however that, as discussed above, it is possible to reconfigure the lists 100, 110 and recalculate values periodically independent of any scheduling iterations, in which case the step 188 would not exist.

Processing begins at a first step 262 where a pointer is made to point to a first physical device in a list of all physical devices for a DA. The list of all physical devices may be provided, for example, by a general device tables stored locally at the DA or stored in the memory 26. Following the step 262 is a test step 264 where it is determined if there are any pending jobs for the physical device being processed. Note that other processes/devices may post pending jobs to a particular physical device in a manner that allows processing at the test step 264 to determine if there are any pending jobs for a device. For example, the test at the step 264 may examine device table(s) stored locally at the DA and/or in the memory 26. In another embodiment, there may be bit maps used by the physical devices where each bit map corresponds to a particular operation (e.g., read, write, copy) and each bit of each bit map corresponds to a particular logical device of the physical device. Each bit may be set to one value if there are any pending jobs and to another value otherwise. For such an embodiment, the test at the step 264 determines if any bits of any of the bit maps indicate the presence of pending jobs.

If it is determined at the step 264 that there is at least one pending job for a physical device, then control transfers from the step 264 to a step 266 where a physical device record corresponding to the physical device is added to the list 100. Following the step 266, or following the step 264 if there are no pending jobs for a physical device, is a step 268 where the pointer used to iterate through all of the physical devices of a DA is incremented to point to the next physical device. Following the step 268 is a test step 272 where it is determined if the pointer has reached the end of the list of physical devices for the DA (i.e., all of the physical devices for a DA have been examined). If so, then processing is complete. Otherwise, control transfers from the step 272 back to the step 264 for another iteration.

Figure 9:
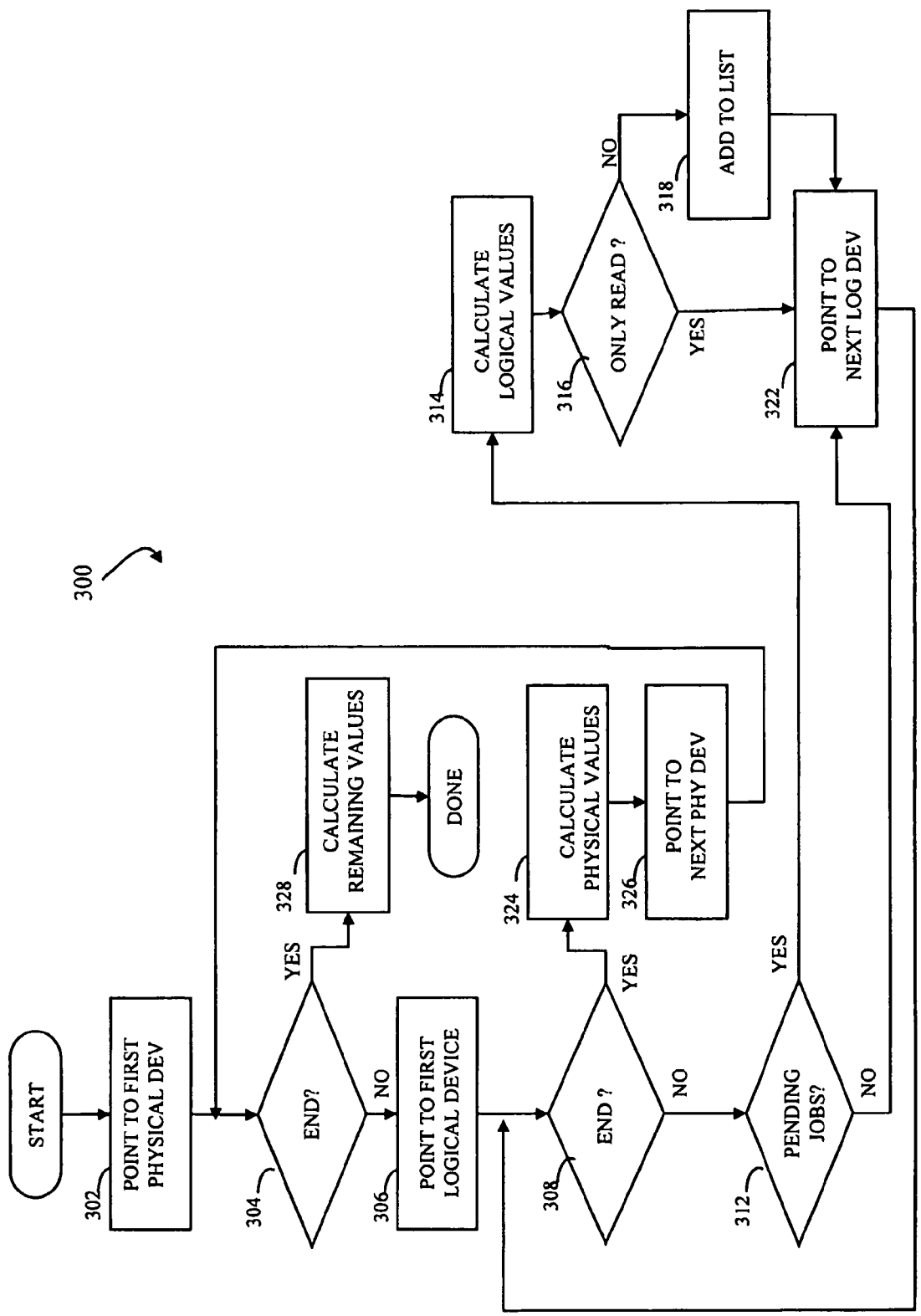
FIG. 9 is a flow chart that illustrates steps performed in connection with constructing a linked list of logical devices according to an embodiment of the system described herein.

Referring to FIG. 9, a flow chart 300 illustrates steps performed in connection with the step 188 of the flow chart 180 of FIG. 6. The flow chart 300 illustrates steps performed in connection with reconfiguring the list 110 of physical devices and recalculating values used for scheduling.

Processing begins at a first step 302 to initialize a pointer used to iterate through all physical devices that have pending jobs (i.e., the list 100 constructed according to the flow chart 260 of FIG. 8). In an embodiment herein, the list 100 is used so that the pointer is set to point to the first physical device record of the list 100 at the step 302. Following the step 302 is a step 304 where it is determined if the end of the list 100 has been reached. If not, then control transfers from the step 304 to a step 306 where another pointer, used to iterate through all of the logical devices of a physical device, is initialized to point to a first logical device of all of the logical devices.

Following the step 306 is a test step 308 where it is determined if the end of the list of all logical devices has been reached (i.e., if all of the logical devices corresponding to a particular physical device have been processed). If not, then control transfers from the step 308 to a test step 312 where it is determined if there are any pending jobs for the logical device being processed. If so, then control transfers from the step 312 to a step 314 where values used for scheduling are calculated for the logical device. Calculations at the step 314 are described in more detail hereinafter. Following the step 314 is a test step 316 where it is determined if all of the pending jobs for a logical device are read only. If not (i.e., if there are more than just read jobs), then control transfers from the step 316 to a step 318 where the logical device is added to the list 110. In an embodiment herein, the system keeps track of logical devices having pending read jobs using a bit map table where each bit corresponds to a logical device and is set to a particular value if there are any pending reads and set to another value otherwise. For such an embodiment, the bit map may be examined to determine if there are pending reads for a logical device and the list 110 may be used for logical devices having pending jobs other than reads. Of course, other techniques may be used, including providing logical device records for all logical devices having any pending jobs (read or otherwise) on to the list 110 or not using any list at all but, instead, relying on one or more bit maps like the read bit map described above.

Following the step 318, or following the step 316 if the only pending job(s) for a logical device are reads is a step 322 where the pointer used to iterate through the logical devices is incremented to point to a next logical device. Note that the step 322 is also reached from the step 312 if there are not any pending jobs for a logical device. Following the step 322, control transfers back to the test step 308, described above, where it is determined if all of the logical devices for a physical device have been processed.

If it is determined at the step 308 that all of the logical devices corresponding to a physical device have been processed, then control transfers from the step 308 to a step 324, where values associated with the physical device and used for scheduling, like max physical run count, are calculated. Calculating values at the step 324 is discussed in more detail elsewhere herein. Following the step 324 is a step 326 where the pointer that iterates through the list 100 of physical devices with pending jobs is incremented to point to the next physical device (i.e., the next one of the physical device records 102-104).

Following the step 326, control transfers back to the step 304, where it is determined if an end of the list of physical devices has been reached. If so, then control transfers from the step 304 to a step 328 where a remainder of variables used for scheduling and associated with each physical device are calculated. Processing at the step 328 is discussed in more detail elsewhere herein. Following the step 328, processing is complete.

Note that it is possible to use any number of appropriate techniques to determine logical variables used for scheduling, including variations of the techniques described herein. Thus, the system described herein includes systems that use any one or more of a number of techniques for determining logical scheduling variables.

Figure 10:
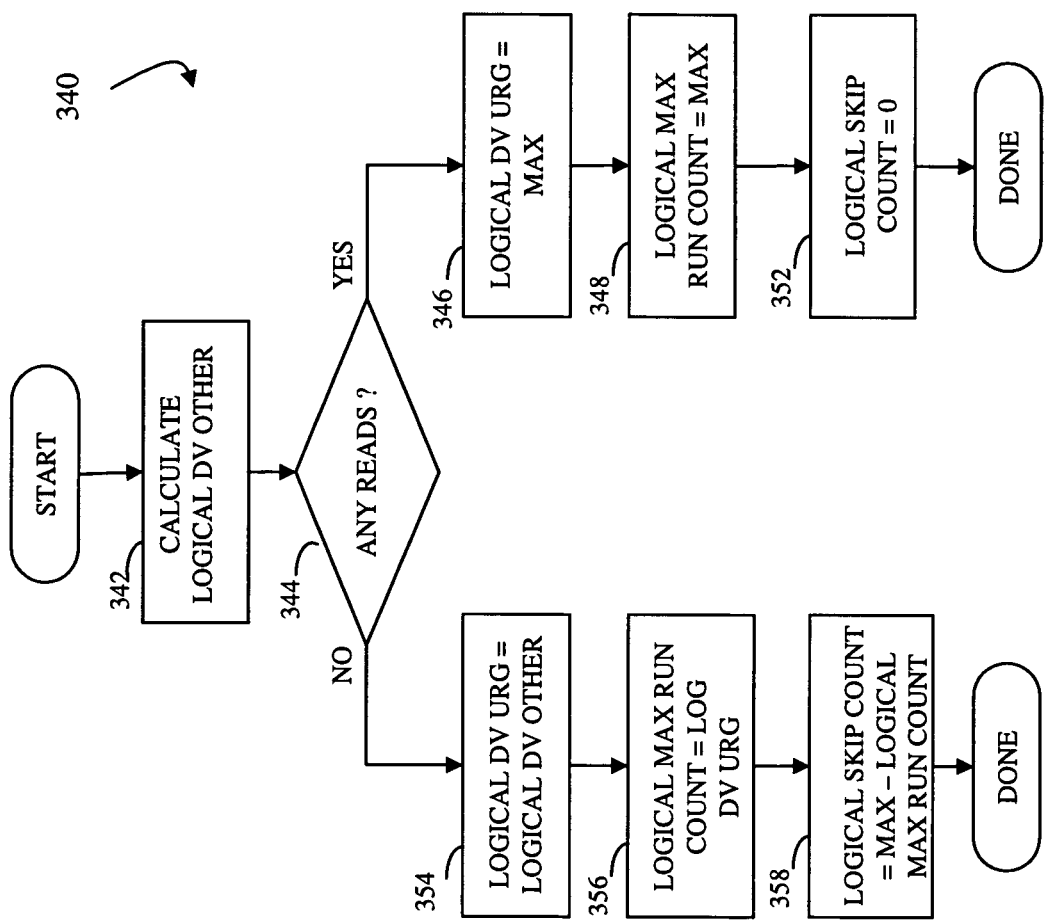
FIG. 10 is a flow chart illustrating steps performed in connection with calculating values for a logical device used in connection with scheduling according to an embodiment of the system described herein.

Referring to FIG. 10, a flow chart 340 illustrates steps performed in connection with the step 314 of the flow chart 300 of FIG. 9 where values used for scheduling are calculated. Processing begins at a first step 342 where a value for a variable, logical other urgency, is calculated. In an embodiment herein, the logical other urgency variable indicates the number of jobs, other than reads, that are pending for a logical device. In an embodiment herein, the value for logical other urgency may be capped to a particular value, such as four.

Following the step 342 is a test step 344 where it is determined if there are any pending reads for the logical device. If so, then control transfers from the step 344 to a step 346 where the value of a variable, logical urgency, is set to a predetermined maximum value, such as four. Following the step 346 is a step 348 where the value of the logical max run count variable (used for scheduling, as discussed elsewhere herein) is set to a maximum value, such as four. Note, however, that in embodiments where only one read at a time is scheduled per logical device per iteration, logical max run count may be set to one (i.e., MAX=one) at the step 348. Following the step 348 is a step 352 where the value of the logical skip count variable (used for scheduling, as discussed elsewhere herein) is set to zero. Following the step 352, processing is complete.

If it is determined at the step 344 that none of the pending jobs for the logical device are reads, then control transfers from the step 344 to a step 354, where the value of the logical urgency variable is set equal to the value of the logical other urgency variable that was set at the step 342. Following the step 354 is a step 356 where the value of logical max run count is set equal to the value of the logical urgency variable. Following the step 356 is a step 358 where the logical skip count variable is set equal to a maximum value (e.g., four) minus the value of the logical max run count variable. Following the step 358, processing is complete.

Figures 11, 12:
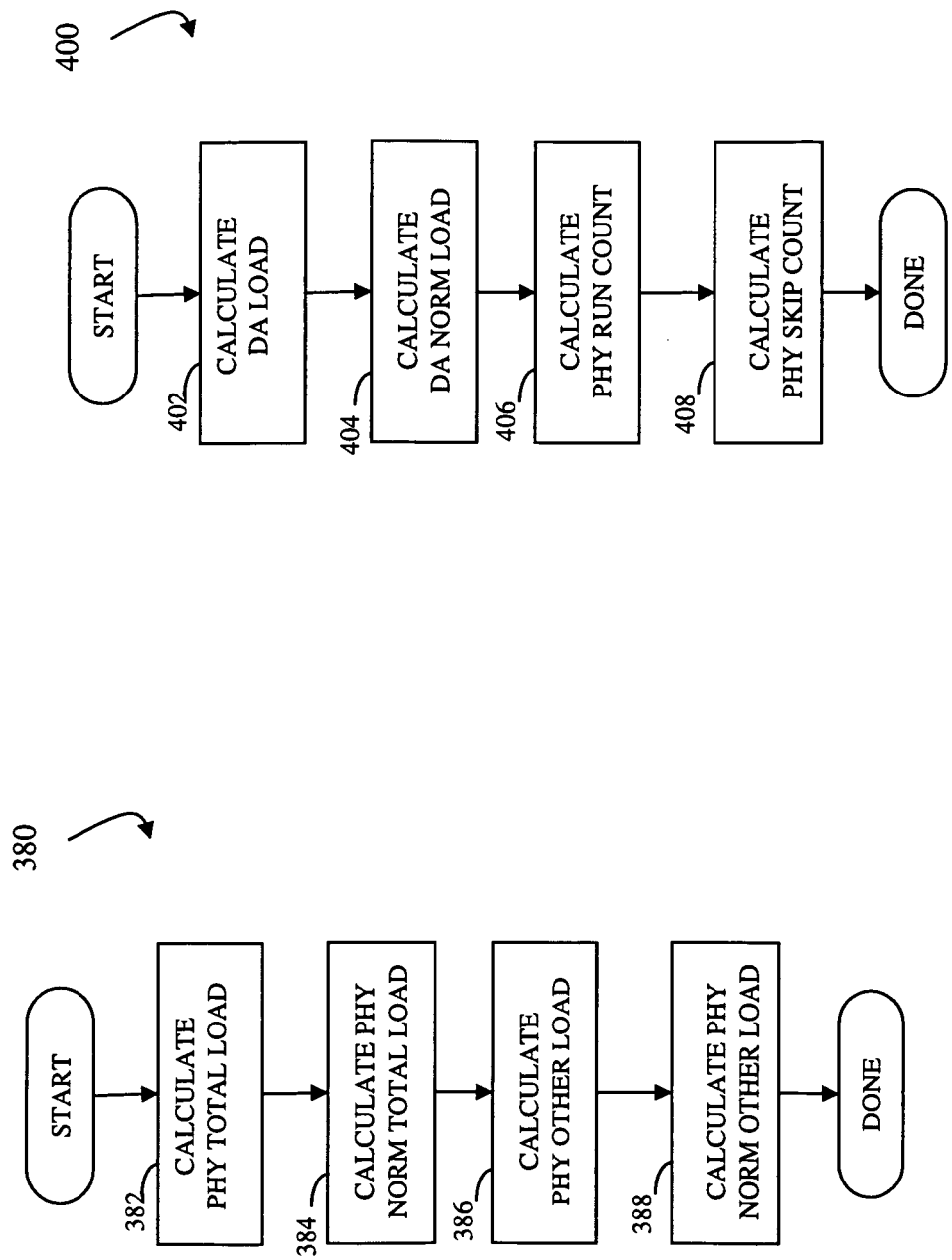
FIG. 11 is a flow chart illustrating steps performed in connection with calculating values for a physical device used in connection with scheduling according to an embodiment of the system described herein.
FIG. 12 is a flow chart illustrating steps performed in connection with calculating additional values for a physical device used in connection with scheduling according to an embodiment of the system described herein.

Referring to FIG. 11, a flow chart 380 illustrates steps performed in connection with the step 324 of the flow chart 300 of FIG. 9 where variables used for scheduling and associated with physical devices are determined. Processing begins at a first step 382 where a variable that represents a total load for a physical device, physical total load, is calculated. In an embodiment herein, physical total load is calculated by summing the number of logical devices at each urgency level multiplied by the urgency level (e.g., number of devices with logical device urgency equal to four times four plus the number of devices with urgency level of three times three, etc.). In some embodiments, the determination is provided by performing the above-referenced calculation only for the values of logical other urgency and then adding to that result the total number of pending read jobs for all the logical devices.

Following the step 382 is a step 384 where a value for another variable, physical normalized total load, is determined. In an embodiment herein, physical normalized total load is determined using the following table:

| physical total load | physical normalized total load |
|---|---|
| <4 | 1 |
| 4~16 | 2 |
| 16~32 | 3 |
| 32~64 | 4 |
| 64~128 | 5 |
| 128~256 | 6 |
| 2565~512 | 7 |
| >512 | 8 |

Of course, other tables/techniques may be used to convert the physical total load to a physical normalized total load value.

Following the step 384 is a step 386 where a value for a variable, physical other load, is calculated. In an embodiment herein, physical other load is calculated like calculating physical total load at the step 382, without taking into account any load or urgency caused by pending read jobs. Following the step 386 is a step 388 where a value for a variable physical normalized other load is determined. In an embodiment herein, physical normalized other load may be determined using the same table that was used at the step 384 to calculate physical normalized total load. In other embodiments, a different technique may be used.

When a physical device has both read jobs pending and other jobs pending, it is helpful to be able to determine an ordering for which types of jobs to schedule. In an embodiment herein, the following table is used:

|   | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | r | r | r | r | o | r | r | r | r | o | r | r | r | r | o |
| 2 | r | r | o | r | r | o | r | r | o | r | r | o | r | r | o |
| 3 | r | r | o | r | r | o | o | r | r | o | r | r | o | o | r |
| 4 | r | o | r | o | r | o | r | o | r | o | r | o | r | o | r |
| 5 | r | o | r | o | r | o | r | o | r | o | r | o | r | o | r |
| 6 | r | o | r | o | r | o | r | o | r | o | r | o | r | o | r |
| 7 | r | o | r | o | r | o | r | o | r | o | r | o | r | o | r |
| 8 | r | o | r | o | r | o | r | o | r | o | r | o | r | o | r | where the far left column represents the value of physical other normalized load, the top row represents the value of a sequence number, and "r" and "o" represent scheduling reads or scheduling other jobs, respectively. The sequence number represents a number that is incremented (modulo fifteen) on each scheduling iteration. Of course, other appropriate techniques may be used to determine whether to schedule reads or other pending jobs. In an embodiment herein, the relative proportion of other operations to reads varies according to the number of pending other operations for a physical device.

Referring to FIG. 12, a flow chart 400 illustrates steps performed in connection with calculating remaining scheduling variables for a physical device at the step 328 of the flow chart 300 of FIG. 9. Processing begins at a first step 402, where a value for a variable, DA total load value, is calculated. In an embodiment herein, DA total load value is the sum of physical total load value for all of the physical devices associated with the DA. Following the step 402 is a step 404 where a DA normalized total load is calculated. In an embodiment herein, the DA normalized total load may be calculated using the following table:

| DA total load | DA normalized total load |
|---|---|
| <40 | 1 |
| 40~160 | 2 |
| 160~320 | 3 |
| 320~640 | 4 |
| 640~1280 | 5 |
| 1280~2560 | 6 |
| 2560~5120 | 7 |
| >5120 | 8 |

Of course, other appropriate techniques may be used to translate the DA total load value to a DA normalized total load value.

Following the step 404 is a step 406 where the value for the physical max run count variable (used for scheduling, as discussed elsewhere herein) is calculated. In an embodiment herein, the physical max run count variable may be determined using the following table:

|   | 1 | 2 | 3 | 4 | 5 | 6 | 7 | 8 |
|---|---|---|---|---|---|---|---|---|
| 1 | 1 | 1 | 1 | 1 | 1 | 1 | 1 | 1 |
| 2 | 4 | 4 | 4 | 4 | 5 | 5 | 5 | 5 |
| 3 | 5 | 5 | 5 | 5 | 6 | 6 | 6 | 6 |
| 4 | 6 | 6 | 6 | 6 | 8 | 8 | 10 | 10 |
| 5 | 6 | 6 | 8 | 8 | 10 | 10 | 12 | 12 |
| 6 | 6 | 8 | 10 | 10 | 12 | 14 | 14 | 16 |
| 7 | 8 | 8 | 10 | 12 | 12 | 14 | 16 | 16 |
| 8 | 8 | 10 | 12 | 14 | 14 | 16 | 16 | 16 | where the top row represents possible values for DA normalized load level, the far left column represents values for physical normalized load level, and the remainder of the cells of the table represent values for physical max run count. Of course, other appropriate techniques may be used.

Following the step 406 is a step 408 where the value of the physical skip count variable is determined. In an embodiment herein, the physical skip count variable may be set by subtracting, from a constant value (e.g., four), the maximum logical urgency level for any of the logical devices of the physical device. Of course, other appropriate techniques may be used.

While the invention has been disclosed in connection with various embodiments, modifications thereon will be readily apparent to those skilled in the art. Accordingly, the spirit and scope of the invention is set forth in the following claims.

What is claimed is:

1. A method of scheduling jobs for a plurality of logical devices associated with physical devices, comprising:
    assigning a physical run count value and a physical skip count value to each of the physical devices;
    at each iteration, examining the physical skip count value and the physical run count value for each of the physical devices;
    scheduling a number of jobs up to the physical run count value for logical devices associated with a particular one of the physical devices at each iteration corresponding to the physical skip count value for the particular one of the physical devices;
    for at least one logical device associated with the particular one of the physical devices, assigning a logical run count value and a logical skip count value thereto, wherein the logical run count value and the logical skip count value are determined separately from the physical run count value and the physical skip count value; and scheduling a number of jobs up to the logical run count value for the at least one logical device associated with the particular one of the physical devices at each iteration corresponding to the logical skip count value for the at least one logical device, wherein scheduling a number of jobs up to the logical run count value includes examining each of a plurality of logical devices associated with the particular physical device to schedule jobs for a subset of the plurality of logical devices, and wherein scheduling jobs for the subset of the plurality of the logical devices includes:
  assigning a logical run count value and a logical skip count value to at least two of the logical devices;
  at each iteration, examining the logical skip count value and the logical run count value for the at least two of the logical devices; and
  scheduling a number of jobs up to the logical run count value for a particular one of the logical devices at each iteration corresponding to the logical skip count value for the particular one of the logical devices,
wherein at least one of the following is provided:
  (i) no logical skip count value and no logical run count value is associated with logical devices having only pending read jobs, or
  (ii) logical devices having only pending read jobs have no logical skip count value associated therewith and have a logical run count value of one.

2. A method, according to claim 1, wherein the physical skip count value and the physical run count value for a particular one of the physical devices varies according to a total load of the particular physical device.

3. A method, according to claim 2, wherein the total load of the particular physical device varies according to a number of jobs for all logical devices associated with the particular physical device and a total number of all jobs for all physical devices associated with a particular physical device controller.

4. A method, according to claim 1, wherein logical devices having pending read jobs are given precedence over other logical devices.

5. A method, according to claim 4, wherein no more than one read job is scheduled for a logical device at each iteration.

6. A method, according to claim 1, further comprising:
  periodically recalculating physical skip count values and physical run count values for physical devices.

7. A computer program product, in a non-transitory computer readable storage medium, that schedules jobs for a plurality of logical devices associated with physical devices, comprising:
  executable code that assigns a physical run count value and a physical skip count value to each of the physical devices;
  executable code that, at each iteration, examines the physical skip count value and the physical run count value for each of the physical devices;
  executable code that schedules a number of jobs up to the physical run count value for logical devices associated with a particular one of the physical devices at each iteration corresponding to the physical skip count value for the particular one of the physical devices; executable code that, for at least one logical device associated with the particular one of the physical devices, assigns a logical run count value and a logical skip count value thereto, wherein the logical run count value and the logical skip count value are determined separately from the physical run count value and the physical skip count value; and
  executable code that schedules a number of jobs up to the logical run count value for the at least one logical device associated with the particular one of the physical devices at each iteration corresponding to the logical skip count value for the at least one logical device, wherein the executable code that schedules the number of jobs up to the logical run count value includes executable code that examines each of a plurality of logical devices associated with the particular physical device to schedule jobs for a subset of the plurality of logical devices, and wherein scheduling jobs for the subset of the plurality of the logical devices includes:
  assigning a logical run count value and a logical skip count value to at least two of the logical devices;
  at each iteration, examining the logical skip count value and the logical run count value for the at least two of the logical devices; and
  scheduling a number of jobs up to the logical run count value for a particular one of the logical devices at each iteration corresponding to the logical skip count value for the particular one of the logical devices,
wherein at least one of the following is provided:
  (i) no logical skip count value and no logical run count value is associated with logical devices having only pending read jobs, or
  (ii) logical devices having only pending read jobs have no logical skip count value associated therewith and have a logical run count value of one.

8. A computer program product, according to claim 7, wherein the physical skip count value and the physical run count value for a particular one of the physical devices varies according to a total load of the particular physical device.

9. A computer program product, according to claim 8, wherein a total load of the particular physical device varies according to a number of jobs for all logical devices associated with the particular physical device and the total number of all jobs for all physical devices.

10. A computer program product, according to claim 7, further comprising:
  executable code that periodically recalculates physical skip count values and physical run count values for physical devices.

11. A data storage device, comprising:
  at least one host adaptor that receives data to be stored in the storage device; and
at least one disk adaptor coupled to the at least one host adaptor and to a plurality of physical disk drives that contain data, wherein the at least one disk adaptor includes a computer program product, in a non-transitory computer readable storage medium, that schedules jobs for a plurality of logical devices associated with the plurality of physical disk drives, the computer program product including:
  executable code that assigns a physical run count value and a physical skip count value to at least a subset of each of the physical disk drives,
  executable code that, at each iteration, examines the physical skip count value and the physical run count value for each of the physical disk drives,
  executable code that schedules a number of jobs up to the physical run count value for logical devices associated with a particular one of the physical disk drives at each iteration corresponding to the physical skip count value for the particular one of the physical disk drives,
  executable code that, for at least one logical device associated with the particular one of the physical devices, assigns a logical run count value and a logical skip count value thereto, wherein the logical run count value and the logical skip count value are determined separately from the physical run count value and the physical skip count value, and executable code that schedules a number of jobs up to the logical run count value for the at least one logical device associated with the particular one of the physical devices at each iteration corresponding to the logical skip count value for the at least one logical device, wherein the executable code that schedules the number of jobs up to the logical run count value includes executable code that examines each of a plurality of logical devices associated with the particular physical device to schedule jobs for a subset of the plurality of logical devices, and wherein scheduling jobs for the subset of the plurality of the logical devices includes:

assigning a logical run count value and a logical skip count value to at least two of the logical devices;

at each iteration, examining the logical skip count value and the logical run count value for the at least two of the logical devices; and scheduling a number of jobs up to the logical run count value for a particular one of the logical devices at each iteration corresponding to the logical skip count value for the particular one of the logical devices, wherein at least one of the following is provided:
(i) no logical skip count value and no logical run count value is associated with logical devices having only pending read jobs, or
(ii) logical devices having only pending read jobs have no logical skip count value associated therewith and have a logical run count value of one.

12. A data storage device, according to claim 11, wherein the at least one host adaptor is coupled to the at least one disk adaptor through a memory.

13. A data storage device, according to claim 11, wherein the at least one host adaptor is coupled directly to the at least one disk adaptor.

14. A data storage device, according to claim 11, wherein the physical skip count value and the physical run count value vary according to a total load of the disk adaptor.

* * * * *